Apr. 17, 1923.

J. T. JONES 1,452,342

RESILIENT TIRED WHEEL

Filed Nov. 15, 1921

INVENTOR
JAMES T. JONES
BY
ATTORNEYS

Patented Apr. 17, 1923.

1,452,342

UNITED STATES PATENT OFFICE.

JAMES THOMAS JONES, OF MAIDENHEAD, ENGLAND.

RESILIENT-TIRED WHEEL.

Application filed November 15, 1921. Serial No. 515,253.

*To all whom it may concern:*

Be it known that I, JAMES THOMAS JONES, a subject of the King of Great Britain, residing at The Firs, Castle Hill, Maidenhead, in the county of Berks, England, have invented new and useful Improvements in Resilient-Tired Wheels, of which the following is a specification.

My invention has for its object to provide resilient tired wheels which overcome objections which apply to pneumatic tired and other resilient tired wheels as hitherto constructed.

According to my invention the tyre-proper is connected with the rim, or felloe, of the wheel with the intervention, at each side of the wheel, of annular spring-pieces which are arched inwards towards each other, they being, at their outward peripheries (which are those of the smaller diameter), affixed to the rim, or felloe, at the sides thereof, and which at their inward peripheries (which are those of the larger diameter) are engaged respectively with the opposite sides of the tyre-proper; the parts being so relatively proportioned that there is an annular space around the wheel, between the rim, or felloe, and the inward periphery of the tyre sufficient to allow of the flexure of the spring-pieces when the weight of the vehicle is upon the tyre. If desired there may be more than one such annular arched spring-piece at each side of the wheel, one within another and with a space between the spring-pieces such as will allow of the flexure of the respective spring-pieces.

In order that my invention and how it may be performed, may be well understood I will describe, with reference to the accompanying drawing, a construction in accordance therewith premising that I do not limit myself to the precise details of the particular construction illustrated.

Figure 2:
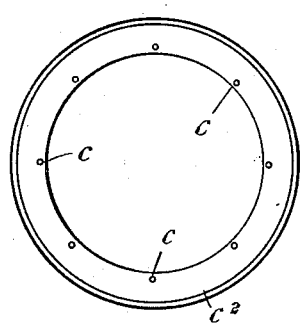
Figure 3:
Figure 4:
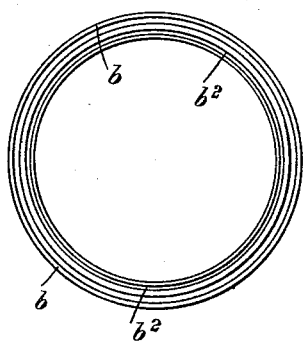
Figure 1:
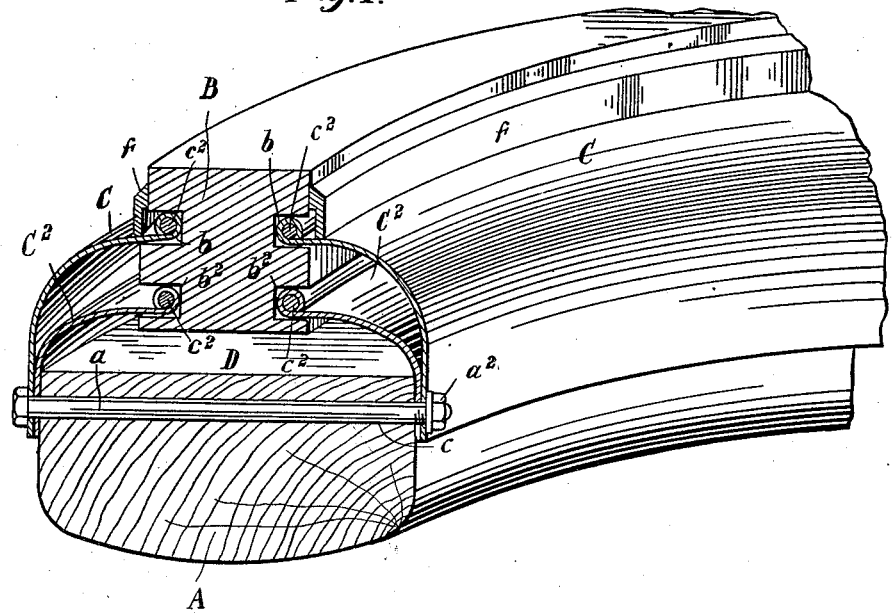

Figure 1 is a sectional perspective view of a portion of a wheel (which may be a disc, or spoke, wheel, or any other suitable description of wheel) shewing a portion of the tyre applied thereto in accordance with my invention. Figures 2 and 3 shew, in side elevation and section, drawn to a smaller scale than Figure 1, one of the spring-pieces separately and Figure 4 shews (also drawn to the smaller scale), in side view, the tyre B separately.

A represents the rim, or felloe, of the wheel; B the solid, or equivalent, tyre (which may be of rubber, or other suitable material,) and C, $C^2$, are the arched spring-pieces by which the tyre is resiliently connected with the rim, or felloe, so as to leave an annular space, at D, between the rim, or felloe, A, and the inner periphery of the tyre B.

In the particular construction illustrated the outward peripheries of the spring-pieces C, $C^2$, are affixed to the rim, or felloe, by bolts $a$, passed through holes $c$, in the said spring-pieces and through the rim, or felloe, and secured by nuts $a^2$, as clearly shewn in Figure 1 and the inward peripheries of the said spring-pieces are beaded, or strengthened by wire hoops, $c^2$, enclosed in the turned-over edges of the said spring-pieces; these edges being engaged with the tyre B, by entering recesses $b$, $b^2$, formed in the sides of the tyre. The entrance of dirt and water into the recesses $b$ may be prevented by ring-pieces $f$ which may be of rubber secured to, or formed with, the tyre, so as to cover the recesses $b$ when the edges of the spring-pieces C are in place.

It is to be understood that my invention is not limited to the use of two pairs of spring-pieces (C, $C^2$,) as illustrated, as, if desired, one spring-piece only, or more than two spring-pieces, may be used at each side of the wheel, the said spring-pieces being made of such resilient material, and of such thickness, as will allow of their proper flexure. Generally thin spring-steel will, I consider, be the most suitable material to employ.

As will be observed, the tyre or tread B is of materially less transverse extent than the wheel rim or felloe A. The spring members C, $C^2$ thus form the opposite sides of an arch-like resilient support, the spring line of which coincides substantially with the wheel rim, while the tread B forms the key of the arch engaged between the spring members C, $C^2$. This construction has the marked advantage that lateral displacement of the tread with respect to the rim, is practically eliminated, while the flexing of the arch members C, $C^2$ results in a resilient flotation of the tread which insures easy riding.

What I claim is:—

1. A vehicle wheel having a rim, a tread radially spaced therefrom and of materially less transverse extent, together with cushioning supports for the tread, said cushioning supports comprising resilient members extending from the opposite sides of the rim toward the tread and engaging the opposite sides of the latter to afford a resilient arch-like support for the tread, the spring line of the arch substantially coinciding with the wheel rim, and the tread member forming the key of the arch.

2. A vehicle wheel having a rim, a tread radially spaced therefrom and of materially less transverse extent, in combination with cushioning supports for the tread, said cushioning supports comprising a plurality of resilient members extending from each of the opposite sides of the rim toward the tread and engaging the opposite sides of the latter at radially spaced points, to afford a plural spring arch-like support for the tread, the spring line of the plural arch coinciding substantially with the wheel rim and the tread forming a key member common to said plural arch-like supports.

3. A vehicle wheel having a rim, a tread radially spaced therefrom, in combination with cushioning supports extending between the rim and tread, said supports comprising substantially, in cross section, spring quadrants extending from the tread to the rim, with their radially outward margins engaging the tread and their radially inward margins engaging the rim, and affording in effect an arch support with the spring line of the arch substantially coincident with the wheel rim.

In testimony whereof I have signed my name to this specification in the presence of two subscribing witnesses.

JAMES THOMAS JONES.

Witnesses:
G. F. TYSON,
EDW'D GEO. DAVIS.